(12) United States Patent
Ackerman et al.

(10) Patent No.: US 9,529,246 B2
(45) Date of Patent: Dec. 27, 2016

(54) TRANSPARENT CAMERA MODULE

(71) Applicants: Nathan Ackerman, Seattle, WA (US); Barry Corlett, Brisbane, CA (US)

(72) Inventors: Nathan Ackerman, Seattle, WA (US); Barry Corlett, Brisbane, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/600,805

(22) Filed: Jan. 20, 2015

(65) Prior Publication Data

US 2016/0209730 A1 Jul. 21, 2016

(51) Int. Cl.
| | | |
|---|---|---|
| *G03B 17/02* | (2006.01) | |
| *G03B 11/00* | (2006.01) | |
| *G02B 5/20* | (2006.01) | |
| *G03B 17/12* | (2006.01) | |
| *H04N 5/225* | (2006.01) | |

(52) U.S. Cl.
CPC ............... *G03B 17/02* (2013.01); *G02B 5/208* (2013.01); *G03B 11/00* (2013.01); *G03B 17/12* (2013.01); *H04N 5/2252* (2013.01); *H04N 5/2253* (2013.01); *H04N 5/2254* (2013.01)

(58) Field of Classification Search
CPC ......... G03B 17/02; G03B 11/00; G03B 17/12; G02B 5/208; H04N 5/2252; H04N 5/2253
See application file for complete search history.

(56) References Cited

U.S. PATENT DOCUMENTS

| | | | |
|---|---|---|---|
| 6,101,034 A | 8/2000 | Cox et al. | |
| 8,259,240 B2 | 9/2012 | Han | |
| 8,274,051 B1 * | 9/2012 | Aswell | G01J 3/513 |
| | | | 250/338.4 |
| 8,384,694 B2 * | 2/2013 | Powell | G06F 3/0425 |
| | | | 345/175 |
| 8,408,821 B2 * | 4/2013 | Wu | H04N 5/33 |
| | | | 348/342 |
| 2011/0080487 A1 * | 4/2011 | Venkataraman | H04N 5/2253 |
| | | | 348/218.1 |
| 2012/0008217 A1 | 1/2012 | Ishak et al. | |
| 2012/0327248 A1 | 12/2012 | Tack et al. | |

(Continued)

FOREIGN PATENT DOCUMENTS

EP 2602654 A1 6/2013

OTHER PUBLICATIONS

Morales, et al., "Comparing Infrared and Visible Illumination for Contactless Hand Based Biometric Scheme", In 42nd Annual IEEE International Carnahan Conference on Security Technology, Oct. 13, 2008, pp. 191-197.

*Primary Examiner* — Amy Hsu
(74) *Attorney, Agent, or Firm* — Micah Goldsmith; Judy Yee; Micky Minhas

(57) ABSTRACT

A camera module is disclosed including an image sensor having an associated optical filter configured to receive a first set of one or more wavelengths of light, and a housing around the image sensor. The housing has an associated optical filter configured to allow a second set of one or more wavelengths of light to pass through the housing and to block the first set of one or more wavelengths of light from passing through the housing. In examples, the second set of one or more wavelengths of light may be light in the visible range of wavelengths, and the housing may be transparent.

20 Claims, 8 Drawing Sheets

(56) References Cited

U.S. PATENT DOCUMENTS

2013/0258044 A1 10/2013 Betts-Lacroix
2014/0055574 A1* 2/2014 Kang ................. H04N 13/0214
                                                              348/49
2014/0078459 A1* 3/2014 Kim ..................... G02F 1/1333
                                                              349/193

* cited by examiner

- - - → λ1
········→ λ2
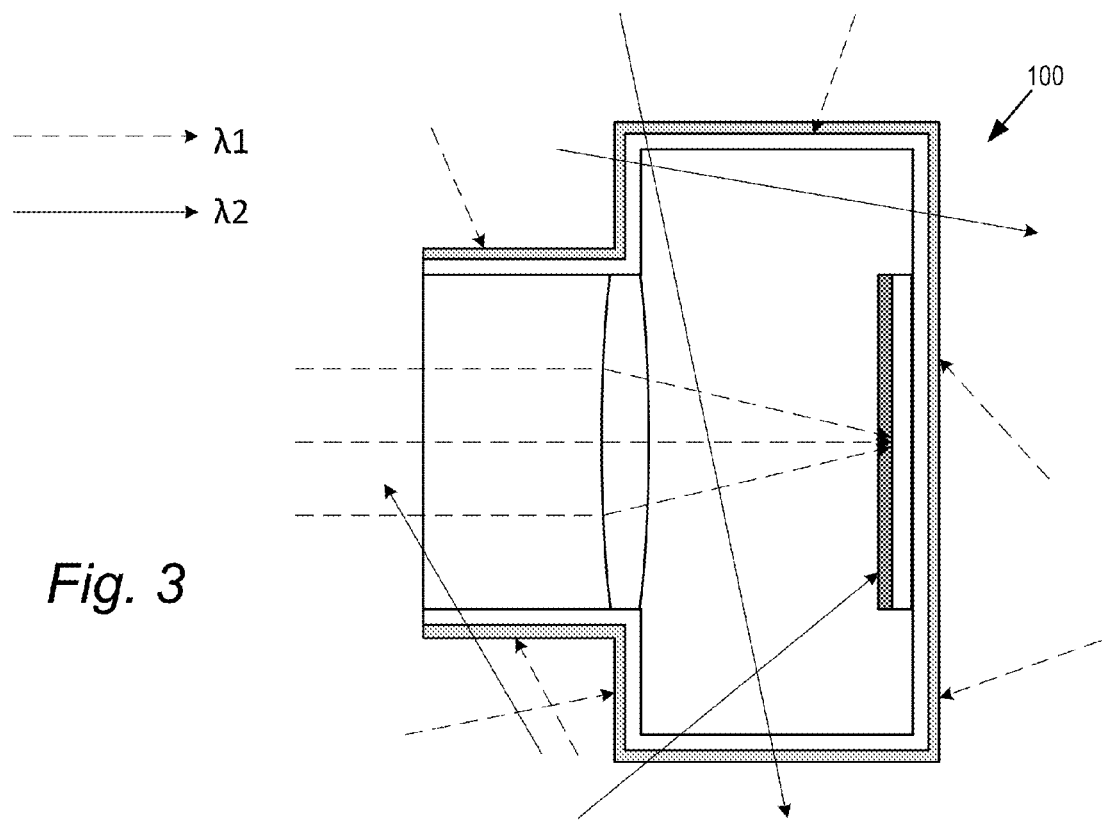
Fig. 3
Fig. 4
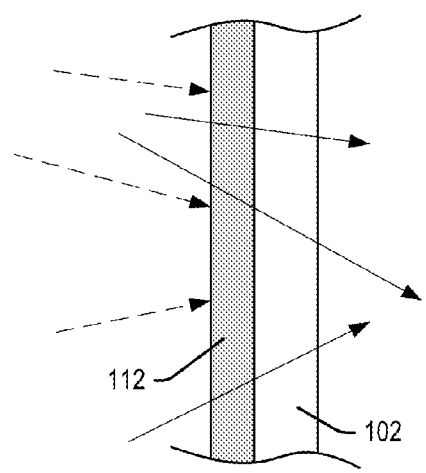
Fig. 5
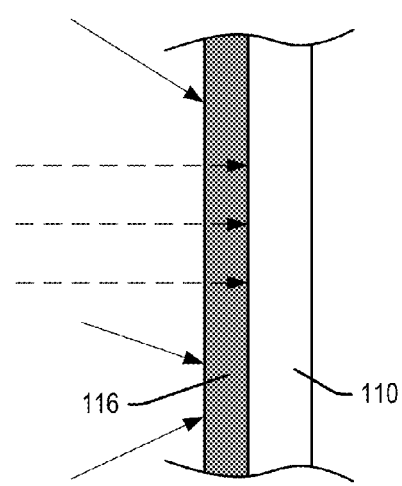

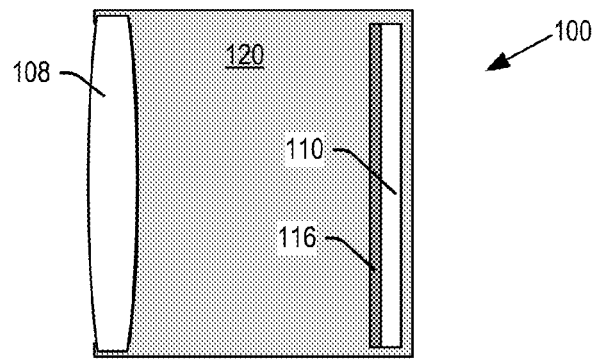
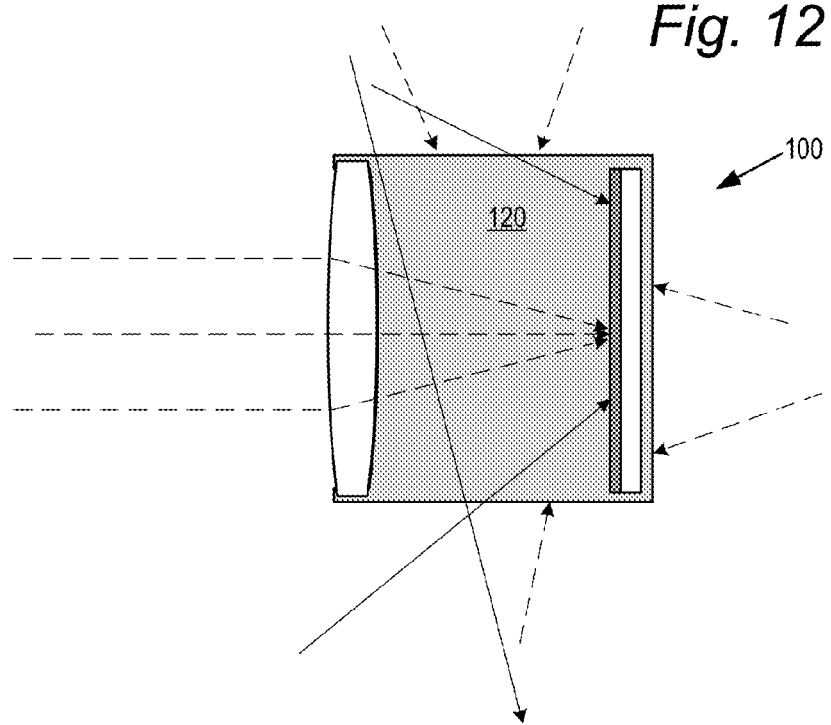

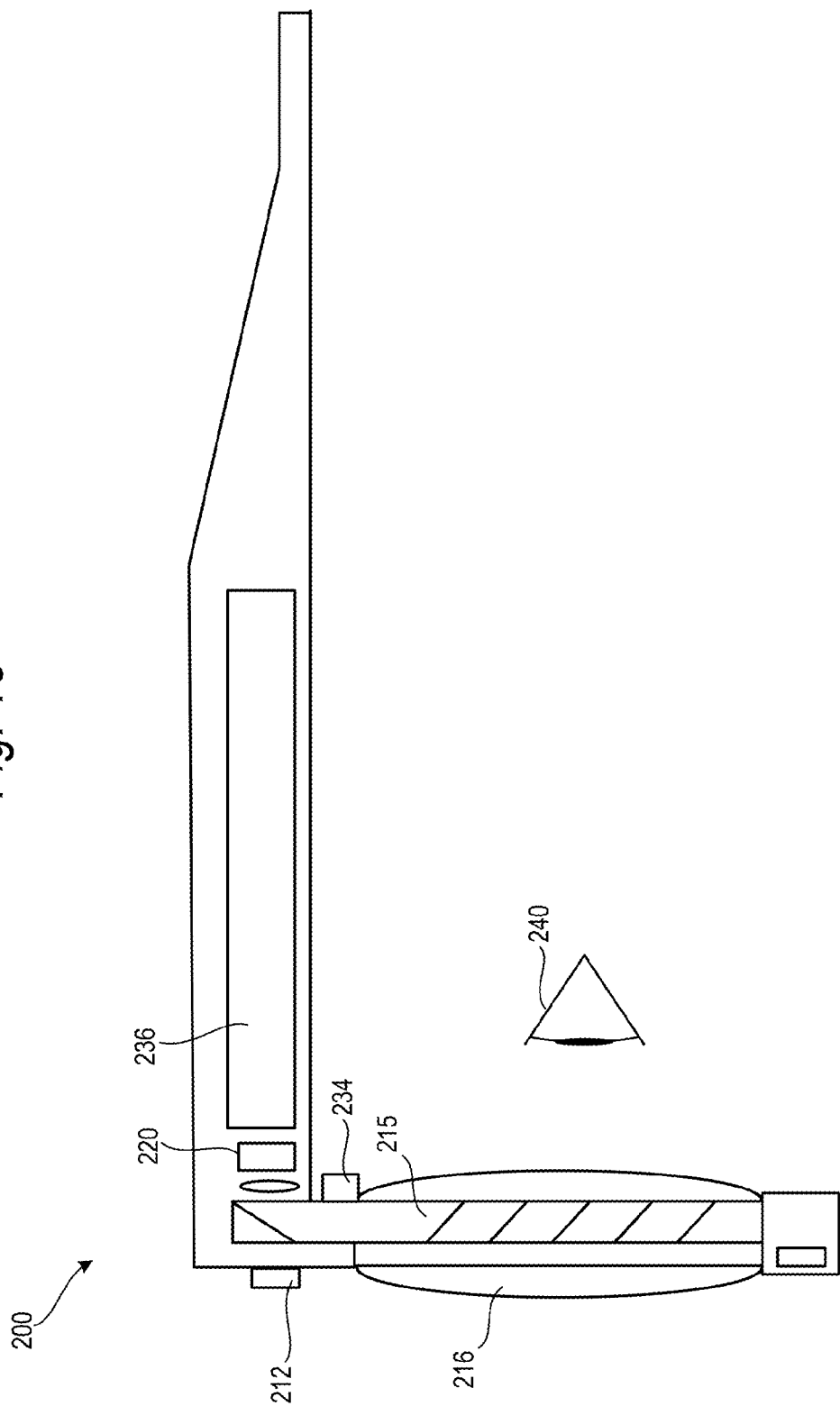

TRANSPARENT CAMERA MODULE

BACKGROUND

It is sometimes desired to position camera modules that are hidden or are otherwise physically not apparent to a user. Since camera modules need to limit/control the light that gets to the sensor, the housing of the camera module is often made of black plastic so that the only light that hits the sensor is light which enters the camera through the camera lens. The exterior housing of the camera is the single largest component of the camera. Thus, the visibility of the camera module is not simply a function of the image sensor or lens, but more determined by the visibility of the exterior housing. As image sensors and optics get smaller, this reduction in size does not translate into less visibility of the camera module since the exterior remains opaque and visible.

SUMMARY

Embodiments of the present technology relate to a camera module with a transparent housing to give the appearance of a smaller camera module while not sacrificing camera module performance. More generally, the present technology relates to a camera module including a lens and an image sensor having an associated optical filter configured to pass a first set of one or more wavelengths of light through to the image sensor. The camera module further includes a housing around the image sensor. The housing has an associated optical filter configured to allow a second set of one or more wavelengths of light to pass through the housing and to block the first set of one or more wavelengths of light from passing through the housing. In examples, the second set of one or more wavelengths of light may be light in the visible range of wavelengths, and the housing may be transparent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is a cross-sectional view as an FIG. 2, illustrating the operation of optical filters in the camera module to selectively transmit and block different wavelengths of light.

FIG. 4 is an enlarged cross-sectional view of a section of the housing and first optical filter of the camera module according to embodiments of the present technology.

FIG. 5 is an enlarged cross-sectional view of a section of the image sensor and second optical filter of the camera module according to embodiments of the present technology.

FIGS. 11 and 12 are cross-sectional views of a camera module according to a further alternative embodiment of the present technology where the housing of the camera module may be omitted.

FIG. 13 is a side view of a head mounted display device for presenting a mixed reality environment and including at least one camera module according to embodiments of the present technology.

DETAILED DESCRIPTION

Embodiments of the present technology will now be described with reference to the figures, which in embodiments relate to a camera module including a transparent housing to provide a small overall appearance without sacrificing camera module performance.

More generally, the present technology relates to a camera module including a lens, an image sensor and a housing. The image sensor may include an associated optical filter configured to pass a first set of one or more wavelengths of light through to the image sensor. In examples, this first set of one or more wavelengths may be infrared or ultraviolet light. The housing also has an associated optical filter configured to allow a second set of one or more wavelengths of light to pass through the housing and to block the first set of one or more wavelengths of light from passing through the housing. In some examples, the second set of one or more wavelengths of light may be light in the visible range of wavelengths, and the housing may be transparent. The first and second filters acting together effectively prevent all light, at least for wavelengths from ultraviolet to infrared, from reaching the image sensor unless the light comes in through the lens.

In examples where the housing is transparent, the transparent housing makes the camera appear to be smaller than a comparable camera having a conventionally opaque housing, while having the same performance as the camera having a conventionally opaque housing.

A camera module according to the present technology may have a variety of applications, but in embodiments may be used in head mounted display devices which include camera modules mounted within a wearer's field of view (FOV) as explained below. Such head mounted display devices may be used in mixed and virtual reality environments, but may have other applications as well.

Figure 1:
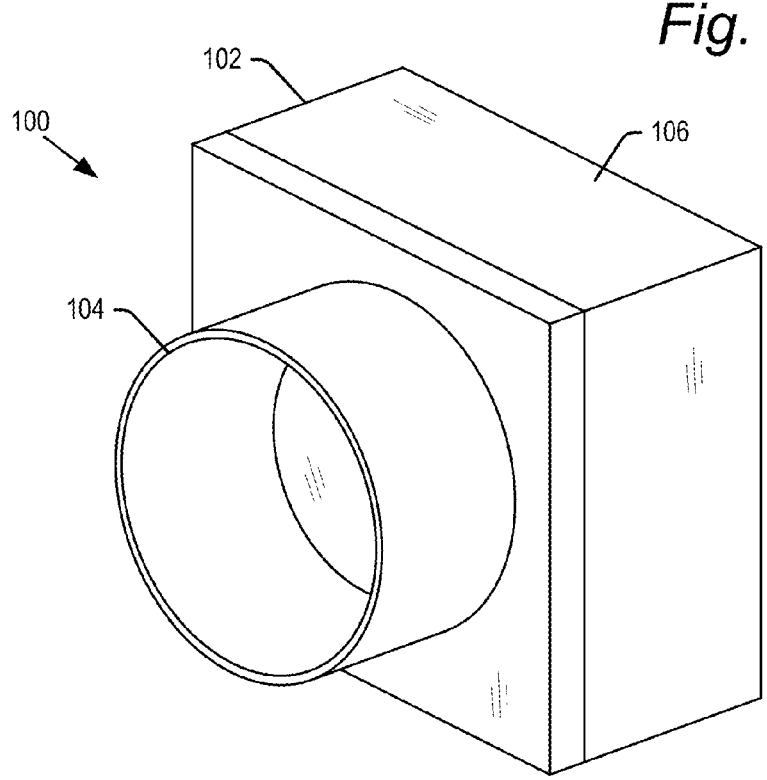
FIG. 1 is a perspective view of a camera module according to embodiments of the present technology.
Figure 2:
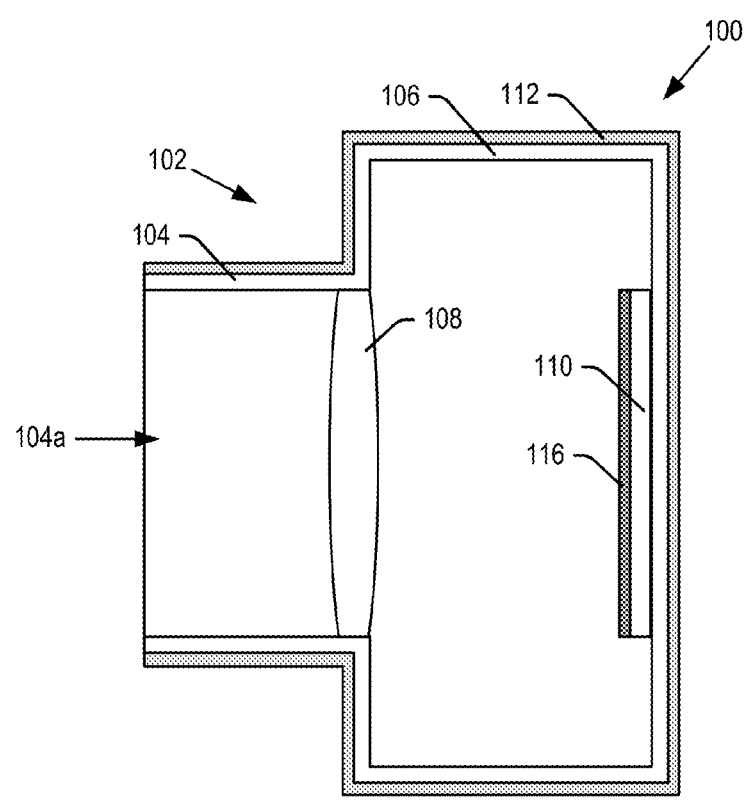
FIG. 2 is a cross-sectional view through a camera module according to embodiments of the present technology.

Referring initially to the perspective and cross-sectional views of FIGS. 1 and 2, respectively, there is shown a camera module 100 configured according to the present technology. Camera module 100 includes a housing 102 having a lens barrel 104 and a focal enclosure 106. Camera module 100 may further include a lens 108 and an image sensor 110. Lens 108 may be used to focus light passing through the lens onto the image sensor 110 in a known manner. Other known camera components and optical components may be provided within and/or as part of camera module 100.

As is known in the art, image sensor 110 may include pixels for registering an amount of light incident thereon. The amount of light incident on a given pixel generates a proportional voltage, which is in turn transformed into a digital signal by means of an A/D-converter (not shown). Image sensor 110 may for example be a CMOS (complementary metal-oxide semiconductor) or CCD (charge-coupled device), but other types of image sensors may be used with the present technology.

The image sensor 110 may be mounted in a fixed position within the focal enclosure 106. The lens barrel 104 of the housing may mount the lens in a desired position with respect to the image sensor. The lens barrel 104 may be an annular cavity open at a first end (opening 104*a*) and at its second end where it connects and opens into the enclosure defined by the focal enclosure 106. The lens 108 is shown near to the second end of the lens barrel 104, but the lens may be positioned at different positions within the lens barrel 104.

The lens barrel 104 and focal enclosure 106 of housing 102 may be formed integrally with each other, or may be separable from each other to allow changing out of the lens 108. Where separable, the barrel 104 may affix to enclosure 106 by a variety of fastening schemes, including one where the barrel 104 screws or snaps into the enclosure 106. The housing 102 may be formed of a variety of rigid and durable materials, including for example LCP (liquid crystal polymer) or a variety of polycarbonates or other plastics. Housing 102 may be formed of other materials including for example toughened or regular glass compositions such as Gorilla® glass from Corning Inc. of Corning, N.Y. Were In embodiments, the housing 102 may be formed by injection molding, but other fabrication processes are contemplated.

In accordance with aspects of the present technology, the housing 102 may be transparent and transmissive at least to visible light (i.e., light of wavelengths that can be seen by humans). Thus, although omitted in FIG. 1 for clarity, the image sensor 110 may be visible through the housing 102.

In accordance with further aspects of the present technology, the housing 102 may include a first optical filter, the properties of which are configured to be transmissive of a first set of one or more wavelengths of light, while preventing a second set of one or more wavelengths of light from passing through. In an embodiment shown in FIG. 2, the first optical filter may be a film 112 applied to an outer or inner surface of the housing 102 by any of various known thin-film deposition processes. These deposition processes include for example vapor deposition, plating, spin coating and other chemical depositions. These deposition processes may also include sputtering, evaporation and other physical depositions.

The optical filtering properties of the film 112 may be controllably provided during the formation of the film 112 in a known manner. In one of several possible examples, the deposition of film 112 includes the deposition of several layers, each layer having a different index of refraction. The layers together form an interference pattern that is transmissive to a selected and controlled wavelength or band of wavelengths, while blocking other wavelengths or bands of wavelengths. In embodiments, the film 112 may absorb, reflect, refract, or diffract unwanted wavelengths of light.

The film 112 is shown as being a relatively thick, shaded layer in the figures for clarity, but in embodiments, film 112 may be transparent and on the order of 5 μm to 50 μm, and in embodiments about 10 μm. Film 112 may be thicker or thinner than this range in further embodiments. Where the film 112 is applied to the walls of housing 102, the walls of housing 102 (without the film 112) may have no optical filtering properties, and may for example be transparent as noted above. In further embodiments, instead of a film, a glass or plastic sheet fabricated with the desired optical properties may be adhered to the inner or outer surfaces of housing 102. As explained below, a separate optical filter may be omitted, and the walls of housing 102 may be formed with the optical filtering properties of the present technology as explained below.

The optical filtering of the housing optical filter film 112 is shown in the cross-sectional view of FIG. 3 and the enlarged cross-sectional view of FIG. 4. In FIGS. 3 and 4, the solid lines represent light of a first set of one or more wavelengths, $\lambda 1$, and the dashed lines represent light of a second set of one or more wavelengths, $\lambda 2$. As is shown, the housing 102 including film 112 may be transmissive to light of wavelength(s) $\lambda 2$, allowing it/them to pass through the housing 102 largely or entirely unaffected. As noted above, wavelength(s) $\lambda 2$ may be the visible light spectrum (e.g., 400 nm to 750 nm), so that the housing 102 including film 112 is transparent.

On the other hand, the film 112 may have optical properties which block light of wavelength(s) $\lambda 1$, preventing it/them from passing through the housing 102 and thus keeping it/them away from image sensor 110. As explained below, the set of one or more wavelengths $\lambda 1$ include at least the wavelength(s) that image sensor 110 is sensitive to. Thus, light of wavelength(s) $\lambda 1$ may be incident on the image sensor 110 if it comes into a front opening 104*a* in the lens barrel 104 and through lens 108. Other light of wavelength(s) $\lambda 1$ is prevented from reaching image sensor 110 by the housing 102 including film 112.

As noted above, in embodiments, image sensor 110 may be an IR image sensor. In such embodiments, $\lambda 1$ may be the IR wavelengths (e.g., 750 nm to 1 mm), and film 112 may for example be a low pass filter or blue filter. In further embodiments, image sensor 110 may be a UV image sensor. In such embodiments, $\lambda 1$ may be the UV wavelengths (e.g., 10 nm to 400 nm), and film 112 may for example be a high pass filter.

Light of wavelengths other than $\lambda 1$ may adversely affect the operation and accuracy of image sensor 110. Accordingly, image sensor 110 may include a second optical filter on its surface, the properties of which are configured to be transmissive of wavelength(s) $\lambda 1$, while preventing wavelength(s) from passing through to the image sensor 110.

The second optical filter may be a film 116 applied to the exposed surface of the image sensor 110 by any of various known thin-film deposition processes. In embodiments, the film 116 may absorb, reflect, refract, or diffract unwanted wavelengths of light. In further embodiments, instead of a film, a glass or plastic sheet configured with the desired optical properties may be adhered to the exposed surface of image sensor 110. In further embodiments, instead of a film, image sensor 110 may be formed in a way such that its natural response is only sensitive to the light of wavelength(s) $\lambda 1$. The film 116 is shown as being a relatively thick layer in the figures for clarity, but in embodiments, film 116 may be on the order of 5 μm to 50 μm, and in embodiments about 10 μm. Film 116 may be thicker or thinner than this range in further embodiments.

The optical filtering of film 116 is shown in the cross-sectional view of FIG. 3 and the enlarged cross-sectional view of FIG. 5. As in FIG. 3, the solid lines in FIG. 5 represent light of wavelength(s) $\lambda 1$, and the dashed lines represent light of wavelength(s) $\lambda 2$. As is shown, the film 116 may be transmissive to light of wavelength(s) $\lambda 1$, allowing it/them to pass through to the image sensor 110 largely or entirely on affected. On the other hand, the film 116 may have optical properties which block light of wavelength(s) λ2, preventing it/them from passing through the filter 116 and keeping it/them away from image sensor 110.

Figure 6A:
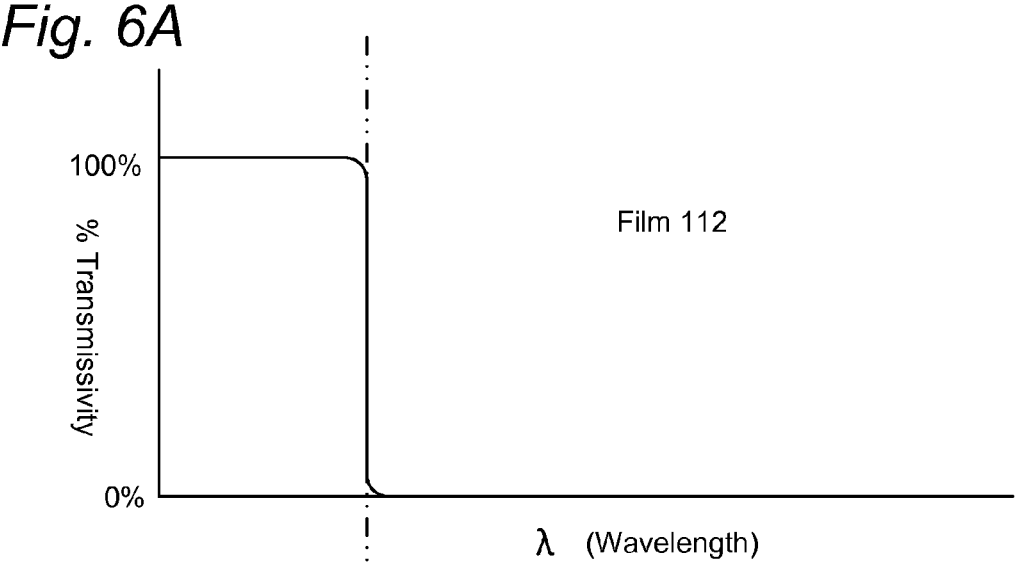
FIGS. 6(A)-6(B) illustrate a first pair of graphs of percentage transmissivity versus wavelength of light for the first and second optical filters according to an embodiment of the present technology.
Figure 6B:
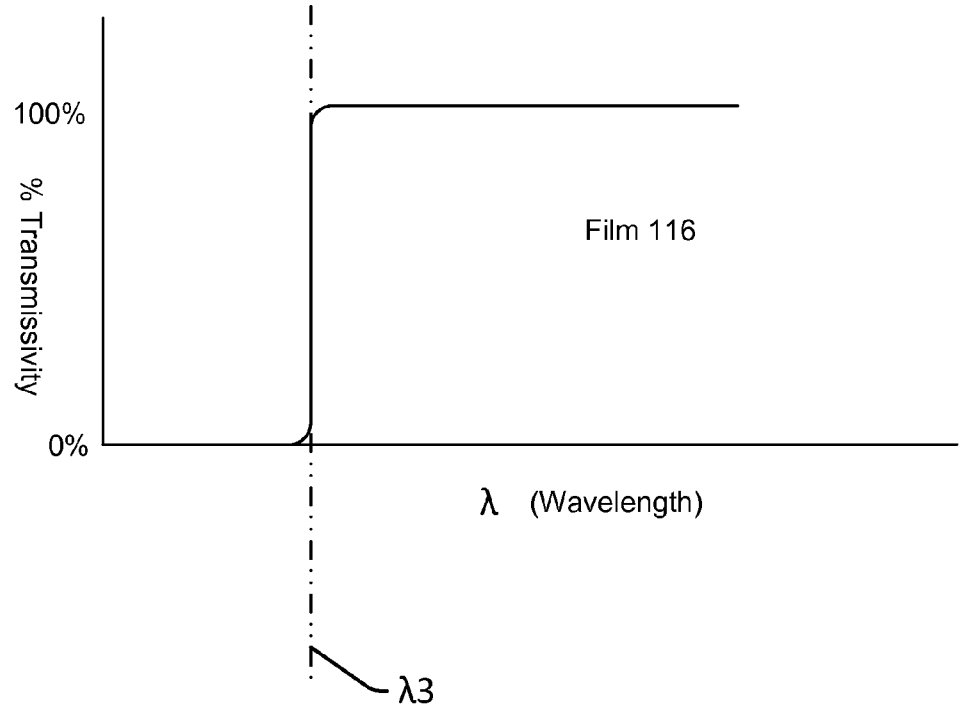

In accordance with the combined optical properties of the housing filter and image sensor filter, in embodiments, no light (at least at least for UV, visible and IR wavelengths) which enters through the housing 102 of camera module 100 (as opposed to through the lens 108) reaches the image sensor 110. Additionally, in embodiments, the optically filtering film 112 on the housing and film 116 on the image sensor are mutually exclusive of the wavelengths of light that they filter. That is, the light filtered by the film 112 is allowed to pass through the film 116. And the light filtered by the film 116 is allowed to pass through the film 112. Thus, all light (at least at least for UV, visible and IR wavelengths) is blocked by one or the other. Referring to the graphs (A) and (B) of FIG. 6, film 112 is transmissive of wavelengths lower than some wavelength λ3, and exclusive of wavelengths above λ3. Conversely, the film 116 blocks wavelengths lower than λ3, and transmits wavelengths above λ3. As set forth above, in examples, may be the boundary between visible light and IR light (e.g., 750 nm). The wavelength may be other values in further embodiments.

Figure 7A:
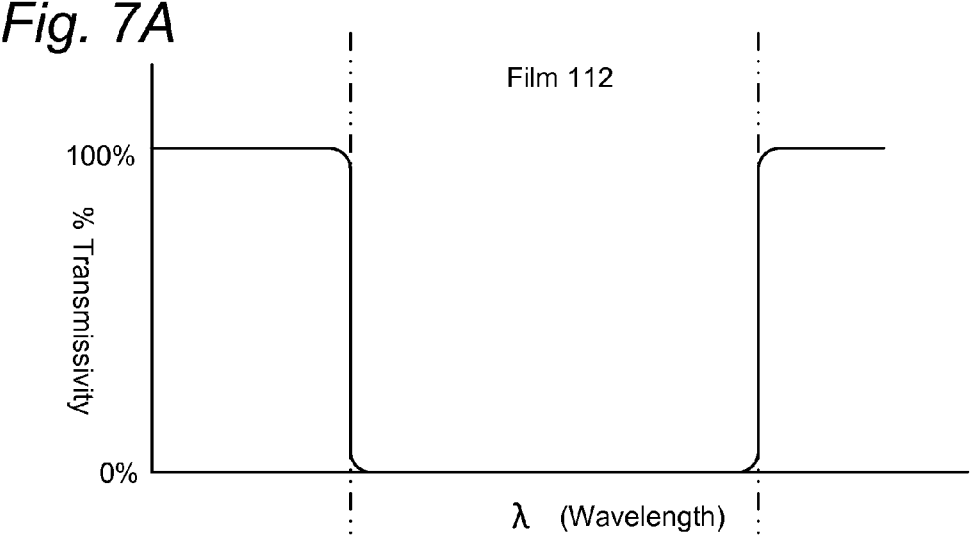
FIGS. 7(A)-7(B) illustrate a second pair of graphs of percentage transmissivity versus wavelength of light for the first and second optical filters according to an alternative embodiment of the present technology.
Figure 7B:
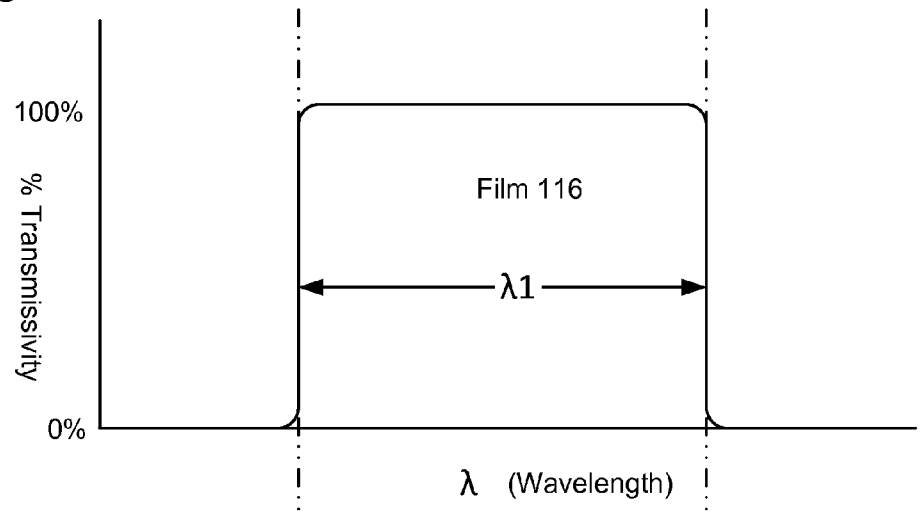

The graphs (A) and (B) of FIG. 7 illustrate a further example where films 112 and 116 are mutually exclusive. As shown in graph (A), the film 112 admits wavelengths below and above λ1, and blocks wavelengths λ1. As shown in graph (B), the film 116 blocks wavelengths below and above λ1, and admits wavelengths λ1. As noted above, λ1 may be the wavelengths for IR light, but need not be in further examples.

Figure 8A:
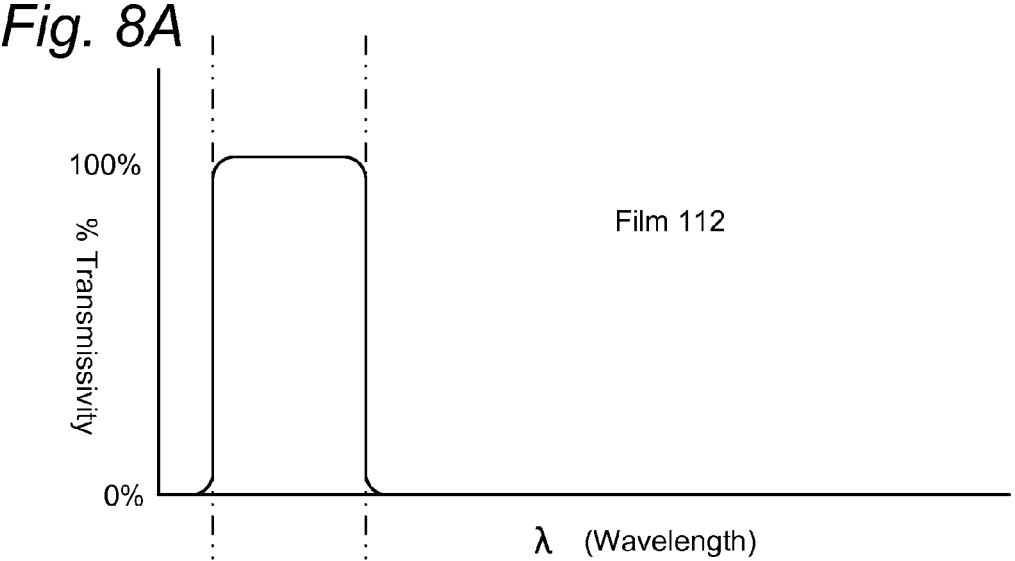
FIGS. 8(A)-8(B) illustrate a third pair of graphs of percentage transmissivity versus wavelength of light for the first and second optical filters according to a further alternative embodiment of the present technology.
Figure 8B:
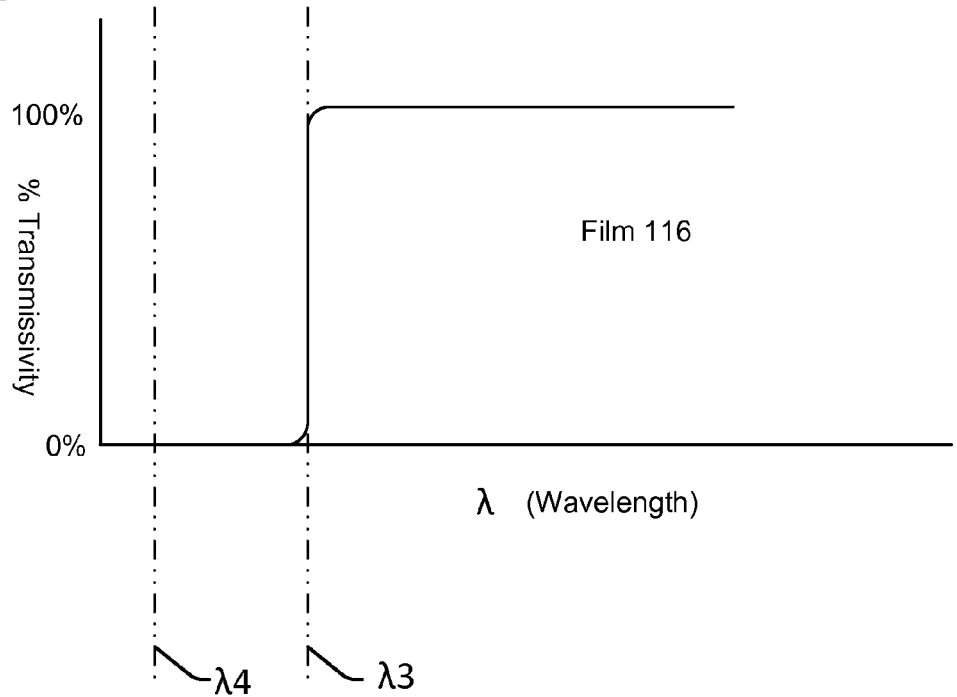

In embodiments, as noted above, all wavelengths are blocked by one of optically filtering films 112 and 116 (or at least those wavelengths over the UV, visible and IR light spectrum). In further embodiments, the optically filtering films 112 and 116 may have some overlap so that they both block certain wavelengths. For example, in the graphs (A) and (B) of FIG. 8, both the film 112 and film 116 block wavelengths below some wavelength λ4. Wavelengths between λ4 and λ3 are transmitted by film 112 and blocked by film 116. And wavelengths above are blocked by film 112 and admitted by film 116. As noted above, in examples, λ3 may be the boundary between visible light and IR light (e.g., 750 nm). In examples, λ4 may be the boundary between UV light and visible light (e.g., 400 nm).

In embodiments described herein, wavelength λ2 which is transmitted by the housing film 112 and blocked by the image sensor film 116 is visible light. This provides an advantage of the present technology that the housing 102 may be transparent to provide a small overall appearance to the camera module 100. However, it is understood that wavelength may be other wavelengths in further embodiments. In such embodiments, the optical filter of housing 102 may allow any wavelength or range of wavelengths, excepting that or those to which image sensor 110 is sensitive to. The housing 102 may be partially transparent or opaque in such embodiments.

In embodiments, the lens barrel 104 and focal enclosure 106 of housing 102 have the same optical filtering properties. However, it is conceivable that the optical filtering properties of the lens barrel 104 and focal enclosure 106 be different in further embodiments. It is conceivable that the lens barrel 104 be transparent and the focal enclosure 106 be opaque, or vice-versa.

Figure 9:
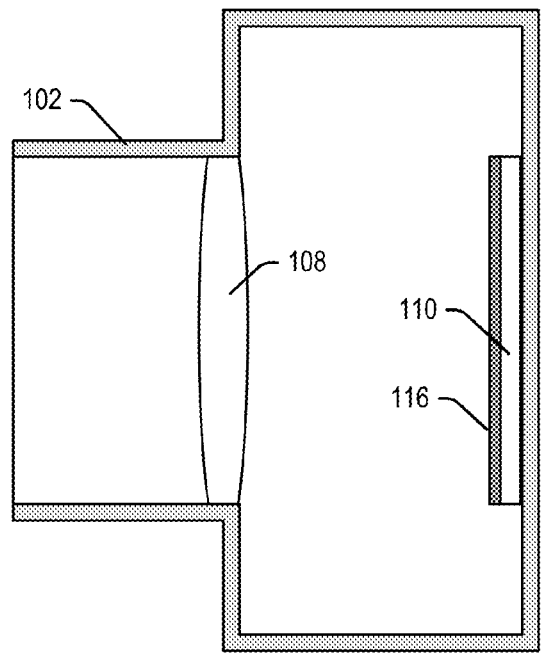
FIGS. 9 and 10 are cross-sectional views of a camera module according to an alternative embodiment of the present technology where the first optical filter may be incorporated as part of the housing of the camera module.
Figure 10:
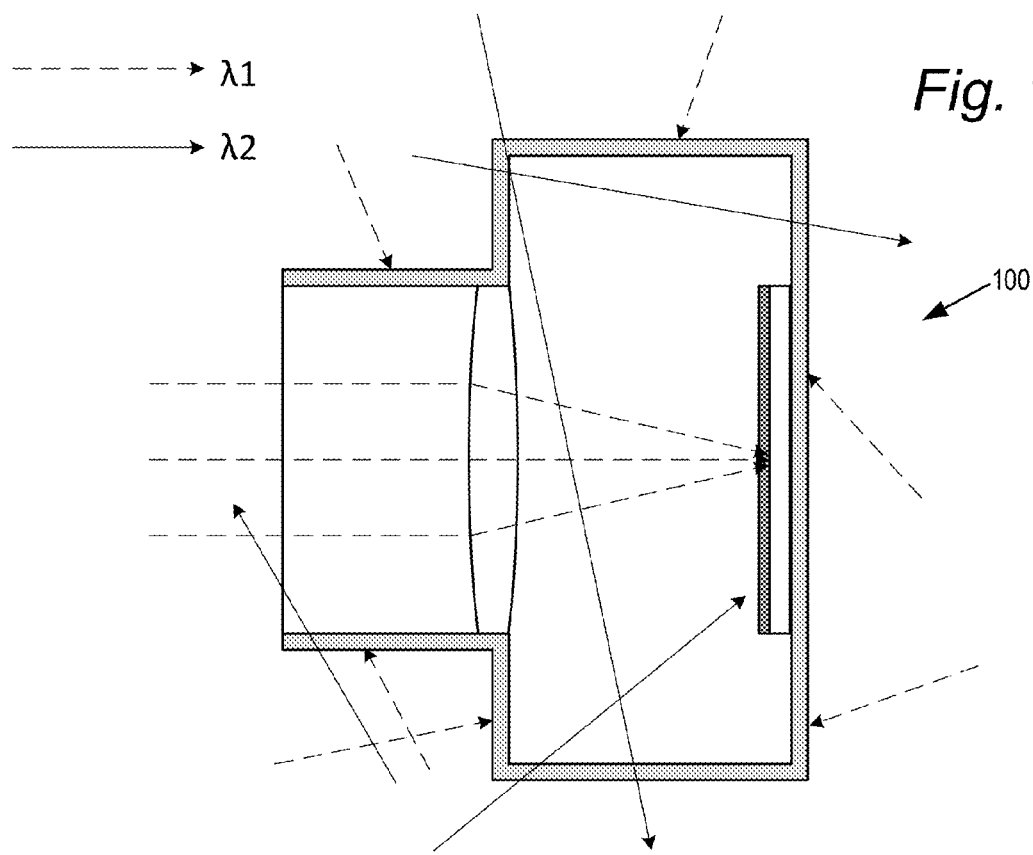

As noted above, in certain embodiments, the film 112 on housing 102 may be omitted, and the material of housing 102 itself may be configured to include optically filtering properties in accordance with the present technology as described above. Such an embodiment is shown in FIGS. 9 and 10. In this embodiment, the housing 102 may be transparent and transmissive of light of wavelength(s) λ2, for example visible light. The housing 102 may also include an optical filter, the properties of which are configured to block light of wavelength(s) λ1, preventing it/them from passing through the housing 102 and keeping it/them away from image sensor 110. Light of wavelength(s) λ1 may be incident on the image sensor 110 if it comes into the front opening 104a in the lens barrel 104 and through lens 108. Other light of wavelength(s) λ1 is prevented from reaching image sensor 110 by the housing 102. The image sensor 110 in the embodiments of FIGS. 9 and 10 may include a film 116, or some other optical filter, as described above.

FIGS. 11 and 12 illustrate a further embodiment of the present technology including a modified configuration of the housing for encasing the lens 108 and image sensor 110. In this embodiment, the lens 108 and image sensor 110 including optically filtering film 116 may be encased within a block 120. Block 120 may mount the lens 108 at the proper focal length with respect to image sensor 110 so that captured images properly focus on image sensor 110. Block 120 may have a size no larger than that required to mount the lens 108 and image sensor 110 (together with any additional included camera module components, not shown) within the camera module and at the proper focal lengths from each other.

Block 120 may be formed of any of the materials described above for housing 102, and may include the optically filtering properties of the film 112 described above. In one example, the block 120 may not have optical filtering properties, but may instead be coated with a an optically filtering film 112 as described above.

The Thus, in the embodiment of FIGS. 11 and 12, the block 120 may be transparent and transmissive of light of wavelength(s) λ2, for example visible light. The block 120 may also be formed as or with an optical filter, the properties of which are configured to block light of wavelength(s) λ1, preventing it/them from passing through the block 120 and keeping it/them away from image sensor 110. Light of wavelength(s) λ1 may be incident on the image sensor 110 if it comes through lens 108. Other light of wavelength(s) λ1 is prevented from reaching image sensor 110 by the block 120.

In further embodiments, the block 120 may be at least partially hollow, filled with a vacuum or air. The image sensor 110 in the embodiments of FIGS. 11 and 12 may include a film 116, or some other optical filter, as described above.

The camera module 100 as set forth in any of the above-described embodiments may be used in a variety of devices and scenarios. In one example, the camera module 100 may be used in a head mounted display device for providing a mixed reality or virtual reality experience to a user. As example of such a head mounted display device 200 is shown in side view in FIG. 13. Details of the device 200 are set forth for example in U.S. published patent application No. 2013/0326364, entitled, "Position Relative Hologram Interactions." However, in general, the head mounted display device 200 may include a room-facing camera 212 that can capture video and still images of an environment in which the device is used, see-through lenses 216 for the user to view the environment, and a micro display 220 and light-guide optical element 215 for displaying virtual images to the eye 240 of the user.

The device 200 further includes an eye tracking assembly 234, which has an eye tracking illumination device and an eye tracking camera. In one embodiment, the eye tracking illumination device includes one or more infrared (IR) emitters, which emit IR light toward the eye. The eye tracking camera includes one or more cameras that sense the reflected IR light. Using this information, the position of the pupil can be identified by known imaging techniques which detect the reflection of the cornea. The operation of the above-described components of head mounted display device 200 may be controlled by a processing unit 236.

The camera module 100 described above with respect to FIGS. 1-12 may be used in the head mounted display device 200, for example as the eye tracking camera of the eye tracking assembly 234 or as the room-facing camera 212. The eye tracking cameras may be positioned in the user's FOV, close to the user's eyes. Having a camera module that is transparent would appear smaller and less obtrusive to the user as compared to a conventional camera having the same properties but with an opaque housing.

In summary, an example of the present technology relates to a camera module for capturing light, comprising: an image sensor optically filtered to receive a first set of one or more wavelengths of light; a lens for receiving light and focusing the received light toward the image sensor; and a housing around the image sensor and a portion of the lens, the housing optically filtered to allow a second set of one or more wavelengths of light to pass through the housing and to block the first set of one or more wavelengths of light from passing through the housing In another example, the present technology relates to a camera module for capturing light, comprising: an image sensor for registering light incident thereon; a first optical filter formed on or within the image sensor for filtering out one or more wavelengths of light from contacting the image sensor; a lens for receiving light and focusing the received light toward the image sensor; a housing around the image sensor and a portion of the lens; and a second optical filter formed on or within the housing for filtering out one or more wavelengths of light from passing through the housing, the first and second optical filters being mutually exclusive with respect to the filtering of wavelengths of light.

In a further example, the present technology relates to a camera module for capturing light, comprising: an image sensor optically filtered to receive a first set of one or more wavelengths of light; a lens for receiving light and focusing the received light toward the image sensor; and a transparent housing around the image sensor and a portion of the lens, the housing optically filtered to allow visible light to pass through the housing and to block the first set of one or more wavelengths of light from passing through the housing.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A camera module for capturing light, comprising:
an image sensor optically filtered to receive a first set of one or more wavelengths of light;
a lens for receiving a first portion of light and focusing the first portion of light toward the image sensor; and
a housing, around the image sensor and a portion of the lens, for receiving a second portion of light not passing through the lens, the housing optically filtered to allow a second set of one or more wavelengths of the second portion of light to pass through the housing and to block the first set of one or more wavelengths of the second portion of light from passing through the housing.

2. The camera module of claim 1, wherein the second set of one or more wavelengths is light in the visible spectrum, the housing being transparent.

3. The camera module of claim 1, wherein a first optical filter associated with the image sensor and a second optical filter associated with the housing prevent all wavelengths of light over at least the ultraviolet, visible light and infrared spectrum from being received in the image sensor except for light of the first set of one or more wavelengths that enter the camera module through the lens.

4. The camera module of claim 1, wherein the first set of one or more wavelengths is light in one of the ultraviolet and infrared spectrums.

5. The camera module of claim 1, wherein the image sensor is optically filtered to block light of the second set of one or more wavelengths.

6. The camera module of claim 1, the housing including a first optical filter on a surface of the housing for optically filtering light incident on the housing to allow the second set of one or more wavelengths of light to pass through the housing and to block the first set of one or more wavelengths of light from passing through the housing.

7. The camera module of claim 6, wherein the optical filter is a film applied on the surface of the housing.

8. The camera module of claim 6, wherein the optical filter is a sheet affixed to the surface of the housing.

9. The camera module of claim 1, the housing formed of a material for optically filtering light incident on the housing to allow the second set of one or more wavelengths of light to pass through the housing and to block the first set of one or more wavelengths of light from passing through the housing.

10. A camera module for capturing light, comprising:
an image sensor for registering light incident thereon;
a first optical filter formed on or within the image sensor for filtering out one or more wavelengths of light from contacting the image sensor;
a lens for receiving light and focusing the received light toward the image sensor;
a housing around the image sensor and a portion of the lens; and
a second optical filter formed on or within the housing for filtering out one or more wavelengths of light from passing through the housing, the first and second optical filters being mutually exclusive with respect to the filtering of wavelengths of light.

11. The camera module of claim 10, wherein the housing is transparent.

12. The camera module of claim 10, wherein the second optical filter filters out at least IR light.

13. The camera module of claim 12, wherein the first optical filter filters out at least visible light.

14. The camera module of claim 10, wherein the first and second optical filter filters together filter out light at least in the ultraviolet range to the infrared range.

15. The camera module of claim 10, the housing comprised of a lens barrel and a focal enclosure.

16. The camera module of claim 10, the housing consisting essentially of a housing around the lens and the image sensor, positioning the image sensor at a focal length away from the lens.

17. A camera module for capturing light, comprising:
an image sensor optically filtered to receive a first set of one or more wavelengths of light;

a lens for receiving light and focusing the received light toward the image sensor; and a transparent housing around the image sensor and a portion of the lens, the housing optically filtered to allow visible light to pass through the housing and to block the first set of one or more wavelengths of light from passing through the housing.

18. The camera module of claim 17, wherein an optical filter associated with the image sensor blocks visible light.

19. The camera module of claim 17, wherein a first optical filter associated with the image sensor and a second optical filter associated with the housing prevent all wavelengths of light over at least the ultraviolet, visible light and infrared spectrum from being received in the image sensor except for light of the first set of one or more wavelengths of light that enter the camera module through the lens.

20. The camera module of claim 17, wherein the first set of one or more wavelengths is light in one of the ultraviolet spectrum and the infrared spectrum.

* * * * *